United States Patent [19]

Lee

[11] 4,232,981
[45] Nov. 11, 1980

[54] BEADED LIQUID PRODUCT AND METHOD FOR REDUCING COEFFICIENT OF FRICTION

[75] Inventor: Fred C. Lee, San Francisco, Calif.

[73] Assignee: Bechtel International Corporation, San Francisco, Calif.

[21] Appl. No.: 918,899

[22] Filed: Jun. 26, 1978

[51] Int. Cl.³ ............................................... F16L 1/00
[52] U.S. Cl. .................................... 405/154; 252/12; 405/158
[58] Field of Search .......................... 61/159, 160, 161; 308/6 A, 6 R, 3 R; 175/65; 252/9, 12

[56] References Cited

U.S. PATENT DOCUMENTS

| 1,893,020 | 1/1933 | Cushing | 308/6 A |
| 2,230,579 | 2/1941 | Wintroath | 308/6 A X |
| 3,097,892 | 7/1963 | Newbury | 308/6 R |
| 3,143,861 | 8/1964 | Dumas | 405/159 |
| 3,549,531 | 12/1970 | Santt | 252/12 X |
| 3,939,081 | 2/1976 | DeHart et al. | 252/12 |
| 4,048,807 | 9/1977 | Ellers et al. | 405/159 |
| 4,063,603 | 12/1977 | Rayborn | 175/65 |

FOREIGN PATENT DOCUMENTS 697108  11/1964  Canada .......................................... 252/12

OTHER PUBLICATIONS

Oil and Gas Journal, Jan. 26, 1959, vol. 57, No. 4, p. 105.

Primary Examiner—Dennis L. Taylor
Attorney, Agent, or Firm—John L. McGannon

[57] ABSTRACT

A product and method for reducing the coefficient of friction between the inner surface of a support, such as a larger conduit, and the outer surface of a member such as a smaller, inner conduit, disposed in and movable along the support when the latter has horizontal and/or inclined portions. The support may be an open trough or pipe of metal, plastic or other material, and the member to be moved can be of similar materials and can be an electrical cable. The product includes a flowable mixture of a liquid and a plurality of spherical beads typically in the range of 0.005 to 0.040 inch in diameter. The mixture can be pumped in and along the support even though the liquid and the beads have different specific gravities. The beads in the liquid contact both the inner surface of the support and the outer surface of the member to be moved to produce a planar ball bearing effect to minimize the frictional forces between them. Depending upon the specific gravities of the liquid and the beads and upon the rheological characteristics of the mixture, the beads can be near the inner surface of the bottom of the support or can be near the inner surface at the top of the support when the support comprises a pipe and when the mixture fills the pipe. The movement of the inner member along the support can be over horizontal distances and a part of the path can be inclined at least slightly without requiring the mixture to be pumped along the support during the time in which the inner member is moving therethrough. Greater inclination of the support may be accommodated when the mixture is being pumped as the inner member moves therethrough. The beads can be of any hard material, such as any one of the harder plastics, glass or metal.

39 Claims, 7 Drawing Figures

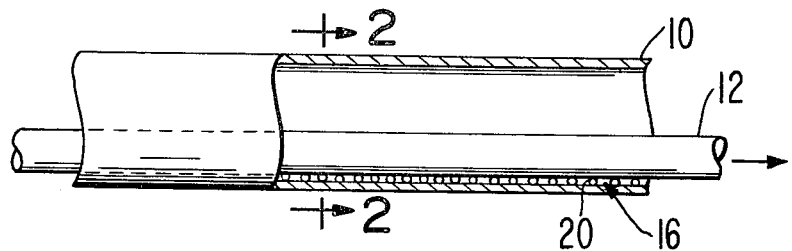
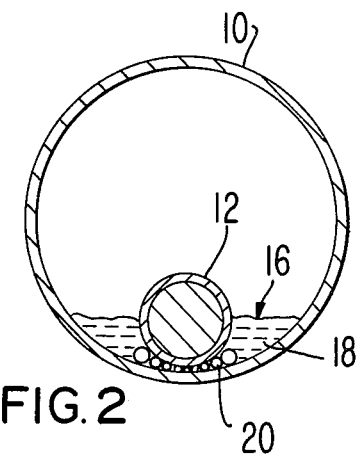
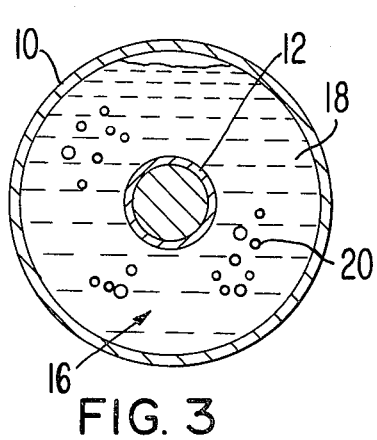
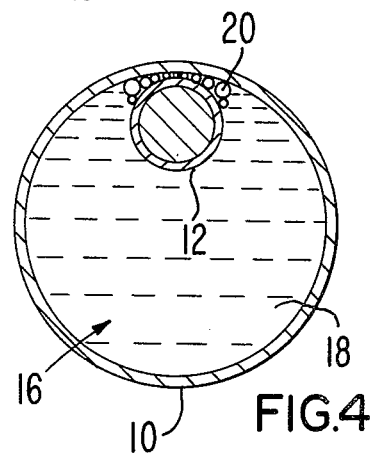
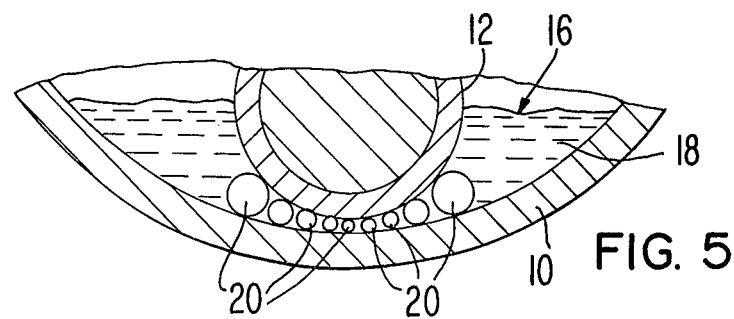
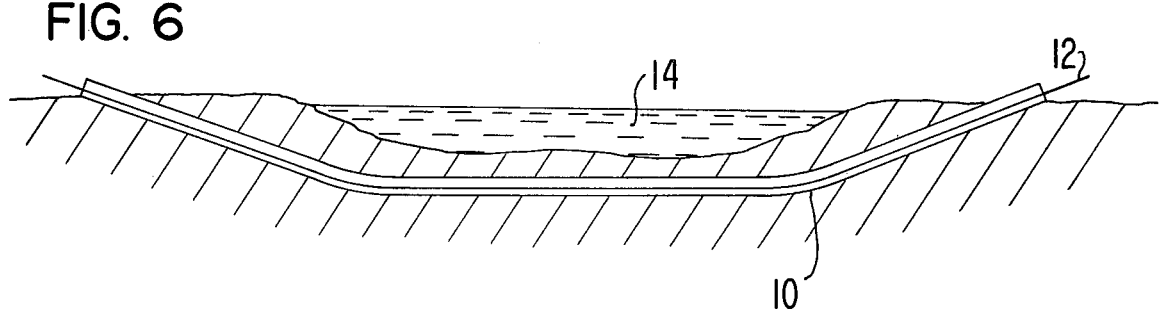
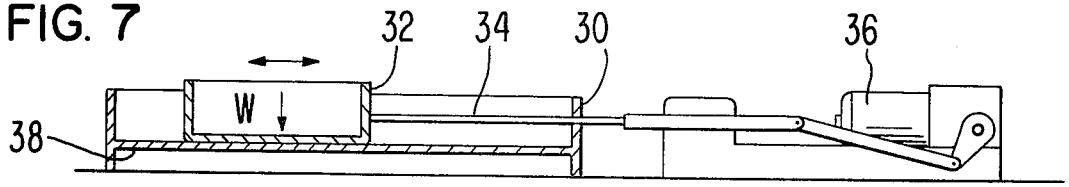

BEADED LIQUID PRODUCT AND METHOD FOR REDUCING COEFFICIENT OF FRICTION

This invention relates to improvements in the movement of inner members, such as electrical cables, inner pipes or capsules, through an outer pipe, such as an underground or undersea conduit, and, more particularly, to a product and method for reducing the frictional forces between such an inner member and the outer support or pipe along which it passes. The properties of the product are such that it is flowable as well as pumpable, and the product may be used in the movement of such an inner member over a long distance.

BACKGROUND OF THE INVENTION

It has been known for many years that placing a lubricant, such as oil or grease, between the surfaces of two adjacent materials will cause the coefficient of friction between the two materials to be reduced. Thus, the force required to drag or push one material across or past another is clearly minimized. The properties of the lubricant such as viscosity, density and the like, can be varied as desired. Furthermore, it has been known for many years that friction between two materials can be reduced by using anti-friction (ball or roller) bearings between them.

The coefficient of friction between two materials can vary depending upon the properties of the materials and their outer contacting surface finish or rugosity. For instance, the coefficient of friction between construction grade steel plates or pipes is about 0.3 to 0.5 if they are dry or with just water lubrication. With oil or grease and/or certain plastic coatings on the contacting surfaces, the coefficient of friction has been found to be as low as 0.15.

It has also been known to use plastic beads, such as divinyl benzene styrene (Teflon added) materials in essentially spherical form to reduce friction between materials. For example, thermoplastic material of this type having bead diameters of 0.010 to 0.025 inch has been mixed with oil field drilling mud and used to lubricate and reduce the friction between the mud itself and the sides of a drilling pipe in which the mud is used in connection with a drilling operation. These styrene beads are held in random suspension in the mud and thus do not form a "pure bearing." Similarly, these styrene beads have been used for water surfactant in water treatment plants, but again, the styrene beads do not operate in a "pure bearing" manner. Styrene beads of this type have been made and sold under the trademark Lubra-Glide by Sun Chemical Products Corp, New Orleans, La. 70130.

Steel balls in grease have also been experimentally used with heavy loads in slow oscillatory motion. This concept has been described in an article appearing in a periodical entitled "Mechanical Engineering," December 1974, pages 27-30.

Some power companies have experienced failures of unprotected high voltage (300-525 Kv) armored cables in submarine crossings due to scour, ships dragging anchors and the like. To give these cables more protection, efforts have been expended in forcing such cables through conduits or pipes laid over the crossing route. This has been limited to relatively short distances due to the weight of the cable, the friction between the cable and the conduit, and the resultant tension required to move the cable through the conduit. Some cable must be spliced at spaced locations along its length due to length limitations of presently available cables. The outer surface coating of the cable must be sufficiently abrasive-resistant to prevent damage to the cable as it is being pulled or pushed through the conduit. An obvious limitation on conventional pipe-enclosed cables has been the length of any continuous stretch of such a cable being restricted to about one mile due to the high friction load of pulling the cable through the conduit. Also, the increase in friction at bends in the conduit require additional effort to force the cable through the conduit.

Attempts have been made in the past to "float" a cable or a gutline-enclosed cable through a conduit, such as a pipeline. U.S. Pat. No. 4,048,807 discloses this concept using a dense slurry or drilling mud to create a substantially neutral buoyancy to essentially suspend the cable within the conduit. However, the maximum reach of such an installation has been calculated to be about four to five miles due to the high coefficient of friction between the cable and the conduit using slurry or drilling mud.

Because of the foregoing limitations in the prior art, a need has existed for an improved product and for a method for use in decreasing the coefficient of friction between an inner member, such as a smaller pipe or an electrical cable of the type described, as it is pulled or otherwise moved along a support or through a larger conduit, such as an underground or an undersea pipeline.

SUMMARY OF THE INVENTION

The present invention satisfies the aforesaid need by providing a product and method for minimizing frictional forces between a shiftable member and a stationary support or housing means, such as an electrical cable, inner pipe or capsule moving along a support capable of containing a flowable mixture. Such a support can include a conduit, such as a pipe, or an open trough-like member. For purposes of hereinafter simplifying the description of the invention, the term "outer conduit" or "conduit" will be used when referring to the above-mentioned support, yet "outer conduit" will include a pipe or an open trough or other member capable of containing a flowable mixture and of supporting an inner member to be moved.

The product of the present invention includes a plurality of beads in a flowable liquid, which liquid has a specific gravity related to the specific gravity of the beads to permit selectivity in the placement of the beads relative to the cross-section of the outer conduit along which the inner member passes. It is possible to select combinations of the specific gravities of the liquid and the beads, and the rheological properties of the liquid, so that the beads can be maintained near the bottom of the conduit, near the top of the conduit or, using beads of two different densities, beads can be maintained both near the top and near the bottom of the conduit. In this way, variations in the locations of the beads can be realized depending upon the location in the conduit where frictional forces are to be minimized between the inner member and the outer conduit.

Among the advantages achieved with the present invention is the lower pulling or pushing force required to move the inner member through the outer conduit. This reduces the wear on the outer surface of the inner member itself so that it can be pulled longer distances with a thinner cover without appreciable damage thereto. Also, the lower pulling or pushing force places substantially less tension or compression on the inner member, enabling it and its outer bearing surface to be much lighter, less durable, and with properties more suitable for the intended operating use than for meeting installation requirements. This feature allows the cable to be made in longer lengths to minimize splicing yet provide a more reliable cable.

The primary object of this invention is to provide an improved product and method for reducing the coefficient of friction between an inner, elongated member moveable along an outer conduit over horizontal, curved and inclined paths to minimize pulling or pushing forces and reduce wear on the outer surface of the inner member as it is moved over longer distances.

Another object of this invention is to provide a product and method of the type described wherein the product is formed from a flowable liquid having a plurality of spherical beads carried therein so that the beads provide a planar ball bearing effect to greatly reduce the frictional forces between the inner member and the outer conduit and allow the inner member to be pulled over greater distances with minimal effort along the outer conduit than is capable with the use of prior techniques.

Still another object of this invention is to provide a product and method of the type described wherein the liquid and the beads can be selected so that their specific gravities are such that the beads can be near the bottom of the conduit, near the top of the conduit, or near the top and bottom of the conduit to accommodate turns, grades and other conduit configurations and to accommodate the specific gravity of the inner member itself to facilitate the movement of the inner member along the conduit with minimum force, tension or compression, and wear.

Specifically, because the liquid can be selected, its specific gravity can be chosen so that it is close to the specific gravity of the inner member for achieving very low net weight of the member in the liquid. The combination of this low net weight and the low coefficient of friction provided by the planar ball bearing effect of the beads results in a very low pulling tension required to pull or push the inner member along the outer conduit. The word "planar" as used herein refers to a plane-like surface in a general sense and is applicable to both flat and cylindrical or curved surfaces.

Other objects of this invention will become apparent as the following specification progresses, reference being had to the accompanying drawings for illustrations showing the way in which the beads are used for minimizing the frictional forces between two relatively shiftable members.

IN THE DRAWING

FIG. 1 is a fragmentary side elevation view showing an outer conduit along which an elongated, inner member passes with the product of the present invention being in the conduit to reduce the friction between the conduit and the member;

FIG. 2 is a cross-sectional view taken along line 2—2 of FIG. 1 showing the beads and liquid of the product in the outer conduit with the beads being near the lower surface portion of the outer conduit, the view showing the conduit only partially filled with liquid, although the liquid will commonly fill the conduit;

FIG. 3 is a view similar to FIG. 2 but showing the beads in suspension within and throughout the liquid in the outer conduit as the mixture of the liquid and beads is transported in turbulent flow through the conduit to fill the same prior to movement of the inner member through the conduit or, as shown, during a time when a partially installed member is not being moved;

FIG. 4 is a view similar to FIG. 2 but showing the beads near the upper surface portion of the outer conduit;

FIG. 5 is an enlarged, fragmentary cross-sectional view similar to FIG. 2 but showing the way in which the size variations of the beads are typically distributed along the lower surface portion of the conduit;

FIG. 6 is a view showing the profile of a conduit laid under a body of water, such as the ocean or a lake, to illustrate the typical horizontal and the inclined components of the conduit through which the inner member is pulled or pushed; and FIG. 7 is a cross-sectional view of a test unit used to test the endurance of the beaded liquid of the present invention.

DETAILED DESCRIPTION

To illustrate the concepts of the present invention, reference is made to FIGS. 1, 2 and 5 wherein an outer conduit 10, which may have horizontal, curved and inclined components, permits an inner member 12, such as an elongated electrical cable, gas, oil pipe or gutline, or other member, to be moved therethrough. The inner member 12 has a diameter less than the inner diameter of conduit 10, and pulling or pushing equipment or both (not shown) is usually used to move member 12 through conduit 10 over long distances. A typical application may be of the type shown in FIG. 6 wherein conduit 10 is below a body of water 14, such as the ocean or a lake. A typical length of conduit 10 could be of the order of 5 to 30 or more miles. Moreover, the conduit as shown in FIG. 6 has both horizontal and inclined components, the inclination typically being anywhere from 2° to 10° but, in extreme conditions, the grade could be greater. Greater inclinations may be best accommodated with the mixture being pumped while moving member 12.

As shown in FIG. 2, conduit 10 contains a flowable mixture 16 of a liquid 18 and a plurality of individual beads 20. Mixture 16 is shown as only partially filling the conduit; however, the mixture typically fills the conduit especially if the conduit has inclined parts as shown in FIG. 6. The beads are selected so that they have specific gravities greater than that of the liquid. Thus, once the mixture is in the conduit, the beads will seek positions on the lower, inner surface portion of conduit 10 since the beads are independent of each other and can move individually. Thus, when member 12 is inserted in conduit 10, the member will move in contact with mixture 16 and over beads 20. The beads will, therefore, provide a planar ball bearing effect so that they define a planar, liquid suspended, ball bearing interface between conduit 10 and member 12. This interface area or "work field" of the beads extends lengthwise and widthwise of conduit 10 and can be controlled in its circumferential extent by the difference in the specific gravities of the liquid and the beads, and the range of size of the beads. Beads rolling on the faces of the "work field" are tending to always assume a working position as a function of their diameters relative to the space between the inner surface of the conduit and the outer surface of member 12 as shown in FIG. 5.

The diameters of beads 20 preferably differ from each other but could be of a uniform size, if desired. A typical range of bead diameters is 5 to 40 mils and is shown in FIG. 5, the smaller diameter beads will be at the lowest part of conduit 10 while the larger beads will be on the more inclined parts of the conduit or near the edges of the "work field." This is because, when member 12 is moved over the spherical beads, the downward forces exerted by member 12 on the beads tends to move or roll the larger beads sideways, leaving the smaller beads more toward the center or beneath member 12. In this way, as the curvature of member 12 forms a greater space between it and the inner surface of conduit 10, the larger beads occupy this greater space and provide a continuity and a broader ball bearing effect area because of the variations in diameters of the beads. The beads 20 can be in liquid 18 in a specific volume range, such as 0.1% to 5.0% by volume of mixture 16, most usually in the range of 0.1% to 2.0%.

The beads can be of any suitable material, such as hard plastic, glass or metal. If plastic, the beads can be of divinyl benzene styrene material so that the compressive strength is 13,000 to 16,000 psi. The beads should be sufficiently hard to carry the required loads, and the beads should have the necessary durability and longevity to function properly. The viscosity of liquid 18 typically falls in the range of 1 to 30 centipoise.

Liquid 18 can be water, oil or other suitable flowable liquid. In most cases, the liquid selected should also be pumpable so that the liquid can be pumped up an incline, such as at the left or right-hand ends of conduit 10 as shown in FIG. 6. Such pumpability provides distribution of the beads within and through conduit 10 and is required when conduit 10 is to be filled with mixture 16 for use as shown in FIGS. 3 and 4.

Beads can be added to liquid 18 before mixture 16 is placed in conduit 10. The length of conduit 10, the weight and/or buoyancy of member 12, and the rugosity of the inner surface of conduit 10 and the outer surface of member 12 will, in part, determine the size of the beads and will contribute to the determination of the volume or amount of beads to be added to or in the liquid. Laboratory tests suggest that the average diameter of the beads should exceed the sum of the root mean square rugosities of the inner member and the outer conduit by a multiple of at least three and as much as six or more, depending on the detail characteristics of the rugosity.

In use, the beads are fluid bearing, i.e., in liquid 18, the beads operate as a "pure planar ball bearing" and not as circular ball bearings or as roller bearings, both of which are conventionally held in races. The beads have been found to stay approximately in individual, separate locations with respect to each other as member 12 is pulled through conduit 10, thus maintaining the desired anti-friction characteristic of mixture 16 after the mixture has been placed in conduit 10. It has also been found that the beads migrate somewhat longitudinally as member 12 is moved through conduit 10. An appropriate surplus of beads in the initial mixture will provide replacement beads to enter the "work field" as the longitudinal migration of beads continues. Also, additional mixture can be pumped into the starting end of conduit 10 while moving member 12.

To position the beads in the work field, mixture 16 is first transported into and through the conduit until the mixture substantially fills the conduit. The mixture is pumped at high velocities with turbulent flow through the conduit even though the liquid and beads are of different specific gravities. As the mixture is being transported, the beads remain in the liquid in a suspended fashion as shown in FIG. 3 due to the turbulence caused by the high velocity movement of the mixture. This turbulent flow assures random distribution of the beads in the liquid after the mixture has come to a halt following the filling of the conduit, so that the beads will be properly distributed in the mixture so as to form the planar work field mentioned above near the bottom surface portion of the conduit, near the top surface portion as hereinafter described with respect to FIG. 4, or, if both heavy and light beads are used, near the bottom and top surface portions of the conduit.

FIG. 4 illustrates still another way in which the beads are distributed in mixture 16. In this case, liquid 18 has a specific gravity greater than that of beads 20 so that the beads will seek the highest part of conduit 10 and will be in reverse locations with reference to that of FIG. 2. Liquid 18 also has a specific gravity greater than that of member 12. The beads are in a "work field" which extends lengthwise and widthwise of conduit 10 so that the beads present a planar ball bearing interface. By providing beads of different diameters, the larger beads tend to remain in the wider space between member 12 and conduit 10 and the smaller beads remain at the peak locations or the highest locations inside conduit 10 for the reasons mentioned above with respect to FIG. 5.

FIG. 7 illustrates a laboratory-scale test set-up for testing the coefficient of friction between an inner member and an outer conduit using the product of the present invention. A trough-like member 30 about three feet in length and simulating conduit 10 receives and supports a second member 32 about one foot in length and simulating member 12 of FIGS. 2 and 5 but also demonstrating the ball bearing concept and effect of this invention as shown in FIGS. 3 and 4. Member 30 was a portion of a conduit with a diameter of 16 inches, and member 32 was a similar portion of smaller conduit having a diameter of 12 inches. Member 32 has a given weight W which, for purposes of testing, was 11.7 lbs. This is rather typical of the unit bearing loads to be expected on full-scale cable installations. A connecting rod 34 coupled the member 32 to a drive means 36 which reciprocated the member 32 within member 30 as member 32 was supported on the inner surface of bottom 38 of member 30 and as member 30 contained a mixture of oil and plastic beads made of divinyl benzene styrene with a Teflon additive. For measuring the coefficient of friction, the connecting rod is removed. A wire is coupled to member 32 and the pulling tension is measured with a hand-held spring scale which is visually read. Results of a number of tests using this set-up with members 30 and 32 comprised of pipe steel are itemized in the following table:

| TEST | MIXTURE | | RUNNING TIME | W | STATIC | | DYNAMIC | |
| --- | --- | --- | --- | --- | --- | --- | --- | --- |
| | OIL | BEADS | | | $T_s$ | COF | $T_d$ | COF |
| 1 | | DRY | 0 | 11.8 lb. | 3.6 lb. | .31 | 2.7 lb. | .23 |
| 2 | .2 liter | 4 milliliter | 0 | 11.7 | 1.12 | .10 | .56 | .048 |

-continued

| TEST | MIXTURE OIL | BEADS | RUNNING TIME | W | STATIC $T_s$ | COF | DYNAMIC $T_d$ | COF |
|---|---|---|---|---|---|---|---|---|
| 3 | " | " | 1.0 hr | " | 1.44 | .12 | .62 | .053 |
| 4 | " | " | 2.0 hr | " | 1.38 | .12 | .62 | .053 |
| 5 | " | " | 4.0 hr | " | 1.44 | .12 | .62 | .053 |
| 6 | " | " | 8.0 hr | " | 1.50 | .13 | .69 | .06 |
| 7 | " | " | 12.0 hr | " | 1.38 | .12 | .62 | .053 |
| 8 | " | " | 16.0 hr | " | 1.63 | .14 | .75 | .064 |
| 9 | " | " | 20.0 hr | " | 1.87 | .16 | .87 | .074 |

SPECIFIC GRAVITY OF OIL = .933
BEADS: 1 milliliter contains about 4000 beads (average 0.025 inch dia.)
$T_s$ = Static Tension (lb.)
$T_d$ = Dynamic Tension (lb.)
COF = Coeff. of friction = T/W The first test above was performed without the product of the present invention. It is seen that the static coefficient of friction for this "dry run" case was 0.31 and the dynamic coefficient of friction was 0.23. The other tests were run with oil as the liquid and with beads of approximately 0.025 inch nominal diameter. One running hour represents a distance of movement of member 32 of 3,760 ft. Thus, test 9 of 20 hours represents a distance of movement of 75,200 feet.

The table shows the significantly large decreases in the static and dynamic coefficients of friction when the product of the present invention is used with the test set-up. The repeatability of the results indicates, at least to a major degree, that the test results are valid.

Microscope examination of the beads during intervals between the tests showed that the beads gradually roughen during the testing with about one-fifth to one-third of them evolving into a roller shape. Some beads maintain their initial spherical shape almost to the event of fracturing, then pulverizing of most of the beads. For instance, after test 9, a microscope observation of 43 beads showed 16 still essentially spherical, 8 in roller form, 10 deformed to about 75 to 90% of true diameter, and 9 fractured.

What is claimed is:

1. A method of moving an inner member along an outer support capable of containing a flowable mixture comprising: providing a flowable, pumpable mixture of a liquid and a number of beads disposed in the liquid; moving the mixture into and along the support in a flow, the specific gravities of the liquid and the beads being different; decreasing the flow so that the beads will be distributed to form a work field of beads near one inner surface portion of the support after said flow has decreased; and moving the member along the support in contact with the mixture and in engagement with the beads in said work field to minimize the friction between the member and the support.

2. A method as set forth in claim 1, wherein the specific gravity of the beads is greater than that of the liquid to cause the work field of beads to be adjacent to the lower, inner surface portion of the support.

3. A method as set forth in claim 1, wherein the said one inner surface portion of said support is transversely concave, the work field extending lengthwise and widthwise of said one inner surface portion.

4. A method as set forth in claim 1, wherein the support comprises a tubular conduit and the mixture substantially fills the conduit, the specific gravity of the beads being less than that of the liquid to cause the work field of the beads to be adjacent to the upper, inner surface portion of the conduit.

5. A method as set forth in claim 1, wherein the support is tubular and has a length a number of times greater than its diameter.

6. A method as set forth in claim 1, wherein the support is tubular and has a central, generally horizontal part and a pair of generally inclined end parts, the central and end parts having lengths a number of times greater than the diameter of the support.

7. A method as set forth in claim 1, wherein the specific gravity of the liquid is greater than that of said beads, said support comprising a tubular conduit.

8. A method as set forth in claim 1, wherein the specific gravity of the liquid is greater than that of some of the beads and less than that of the remainder of the beads.

9. A method as set forth in claim 1, wherein the liquid is water.

10. A method as set forth in claim 1, wherein the liquid is oil.

11. A method as set forth in claim 1, wherein the beads are of different sizes, the larger beads being adjacent to the outer extremities of the work field and the smaller beads being centrally disposed in the work field as the member moves along said support adjacent to said one surface portion thereof.

12. A method as set forth in claim 1, wherein the beads have a diameter in the range of 0.005 to 0.040 inch.

13. A method as set forth in claim 1, wherein the beads are formed from glass.

14. A method as set forth in claim 1, wherein the beads are formed from plastic material.

15. A method as set forth in claim 1, wherein the beads are formed from metal.

16. A method as set forth in claim 1, wherein the beads are generally spherical.

17. A method as set forth in claim 1, wherein the beads comprise about 0.1% to 5.0% by volume of the mixture.

18. A method as set forth in claim 1, wherein the inner surface portion of the support is transversely concave and has a radius of curvature, the inner member having an outer convex surface provided with a radius of curvature less than that of said inner surface portion, the beads being of different sizes, the smaller being between the support and the member near the narrowest gap distance therebetween, the larger beads being between the support and the member near the greater gap distance therebetween.

19. A method as set forth in claim 1, wherein a portion of the support is inclined, said moving step including advancing the member along said inclined portion, and including the step of pumping the mixture along said inclined portion to maintain the work field along the same.

20. A product for reducing the coefficient of friction between the inner surface of a support capable of containing a flowable mixture and the outer surface of an inner member movable along the support comprising: a flowable, pumpable mixture of a liquid and a plurality of beads, said mixture having characteristics permitting it to be movable in a flow into and along the support, the beads being independent of each other and the specific gravities of the liquid and the beads being different to permit the beads to move in the liquid into positions in which the beads define a work field of beads near one inner surface portion of the support when the flow of the mixture has decreased along the support.

21. A product as set forth in claim 20, wherein the liquid has a specific gravity less than that of the beads.

22. A product as set forth in claim 20, wherein the liquid has a specific gravity greater than that of the beads.

23. A product as set forth in claim 20, wherein the liquid has a specific gravity greater than that of some of the beads and less than that of the remainder of the beads.

24. A product as set forth in claim 20, wherein the liquid is water.

25. A product as set forth in claim 20, wherein the liquid is oil.

26. A product as set forth in claim 20, wherein the beads have a diameter in the range of 0.005 and 0.040 inch.

27. A product as set forth in claim 20, wherein the beads have a number of different diameters.

28. A product as set forth in claim 20, wherein the beads are formed from glass.

29. A product as set forth in claim 20, wherein the beads are formed from plastic material.

30. A product as set forth in claim 20, wherein the beads are formed of metal.

31. A product as set forth in claim 20, wherein the beads are generally spherical.

32. A product as set forth in claim 20, wherein the beads comprise about 0.1% to 5.0% by volume of the mixture.

33. A product as set forth in claim 20, wherein the mixture is pumpable.

34. In a method of moving an inner member along an outer support capable of containing a flowable mixture: providing a flowable, pumpable mixture of a liquid and a number of beads disposed in the liquid; moving the mixture into and along the support in a flow, the specific gravities of the liquid and the beads being different; and decreasing the flow so that the beads will be distributed to form a work field of beads near one inner surface portion of the support after said flow has decreased.

35. In a method as set forth in claim 34, wherein said work field is substantially planar.

36. In a method as set forth in claim 34, wherein the support is tubular and the mixture substantially fills the conduit.

37. In a method as set forth in claim 36, wherein the specific gravity of the beads is greater than that of the liquid to cause the work field of beads to be adjacent to the lower, inner surface portion of the support.

38. In a method as set forth in claim 36, wherein the specific gravity of the beads is less than that of the liquid to cause the work field of the beads to be adjacent to the upper, inner surface portion of the support.

39. In a method as set forth in claim 36, wherein the specific gravity of the liquid is greater than that of some of the beads and less than that of the remainder of the beads.

* * * * *